May 20, 1969     A. LANES ET AL     3,445,634
CORRELATION IDENTIFICATION APPARATUS
Filed March 16, 1965     Sheet _1_ of 9

INVENTORS
ALBERT LANES
ROBERT E. RACHLIS
IRVING ROTH
EDWARD W. STARK
BY
ATTORNEY

May 20, 1969  A. LANES ET AL  3,445,634
CORRELATION IDENTIFICATION APPARATUS
Filed March 16, 1965  Sheet 2 of 9

INVENTORS
ALBERT LANES
ROBERT E. RACHLIS
IRVING ROTH
EDWARD W. STARK
BY
*H P Ferry*
ATTORNEY

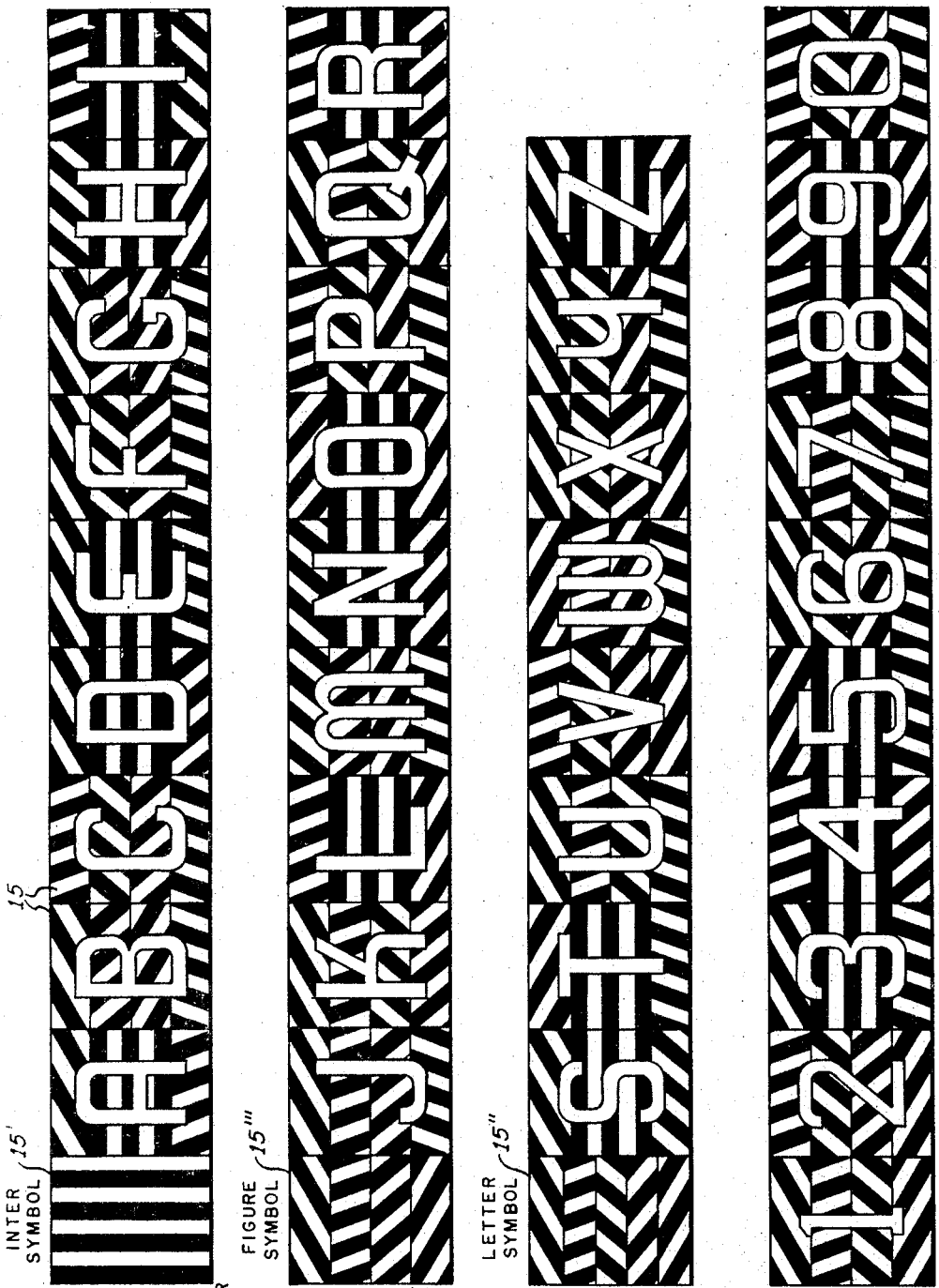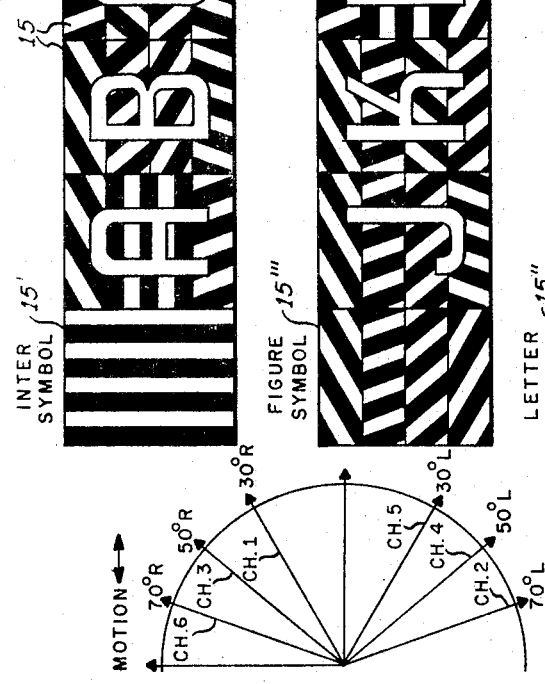

INVENTORS
ALBERT LANES
ROBERT E. RACHLIS
IRVING ROTH
EDWARD W. STARK
BY

ATTORNEY

United States Patent Office 3,445,634
Patented May 20, 1969

3,445,634
CORRELATION IDENTIFICATION APPARATUS
Albert Lanes, Flushing, Robert E. Rachlis, Freeport, Irving Roth, East Williston, and Edward W. Stark, Garden City, N.Y., assignors to Sperry Rand Corporation, Great Neck, N.Y., a corporation of Delaware
Filed Mar. 16, 1965, Ser. No. 440,251
Int. Cl. G06k 7/00, 9/00
U.S. Cl. 235—61.11                               18 Claims

ABSTRACT OF THE DISCLOSURE

An optical correlation system for identifying moving objects having identification patterns characterized by alternate stripes of contrasting transmissivities with the stripes of each pattern disposed at a different angle and mounted on the object to be identified. A plurality of reference masks each having a correspondingly disposed pattern with respect to its associated identification pattern is in spaced location with respect to the identification pattern. A plurality of detectors are cooperative with respective reference masks and respective identification patterns and responsive to the relative movement of the identification patterns with respect to their associated reference masks for providing respective outputs representative of the respective functions of the optical correlation therebetween.

---

This invention relates to optical correlation and particularly to identification of moving objects such as railroad cars using auto-correlation techniques.

It has been considered desirable by the railroad industry to process the movement, location and cargo of railroad cars automatically by data processing devices. However, to date, this has not proved feasible due to the lack of suitable apparatus for automatically, accurately, and inexpensively identifying individual railroad cars. Presently, the railroad car ownership and number designation is printed on the car and is used to identify each car. This information is presently obtained by visual inspection and then written manually and transcribed generally to one or more typewritten lists and then via teletype to the numerous data handling centers, freight yards and other operating locations. This is a tedious and expensive process, which not only is very slow but introduces a substantial number of human errors which results in poor operating performance with respect to the proper delivery and distribution particularly of freight cars.

The railroad industry is, therefore, endeavoring to provide a more efficient, automatic and reliable system for data processing in which certain specific limitations must be met. An identification symbol must not extend beyond a certain dimension from the railroad car. Further, a scanner mounted on the side of the railroad track must lie outside a certain clearance distance for wayside objects. The identification symbol or tag as well as the scanner should be simple and rugged. The identification symbol itself preferably should be unpowered and require a minimum of maintenance after installation. Further, since it will be attached to existing railroad cars it should be relatively easy to build and attach.

The overall data processing system including the identification portion must operate considerably more reliably than human beings. It must be capable of identifying railroad cars travelling throughout speed ranges of 5 to 60 miles per hour or more. In addition, the equipment is exposed to the elements throughout the year and therefore must operate satisfactorily in all climates and conditions encountered in normal railroad service including variations in temperature, visibility, sun, wind, rain, snow, ice, dirt, vibration, and shock as experienced in railroad operation. Further, the sensing device must recognize the direction of travel of the railroad car. In the event the identifying symbols fail to pass a parity test, the system must be capable of indicating that the identification may be in error. Also, the information as sensed by the detector must be compatible with a simple data transmission system such as a five channel teletype for transmission to various remote points. The operating tolerances of the system must provide accurate readout in spite of the normal variation in height, side sway and inclination of freight cars in motion.

The present invention concerns a unique electro-optical correlation system which satisfies all of the above-mentioned requirements while providing extremely accurate information with respect to railroad car identification and simultaneously provides error checks with respect to the identifying symbols.

It is a primary object of the present invention to provide an electro-optical system for automatically identifying moving objects by means of auto-correlation techniques.

It is a further object of the present invention to provide an optical correlation system in which an information designation has a correspondingly disposed reference cooperative with a correspondingly disposed detector by means of which auto-correlation functions are simply and accurately measured.

It is an additional object of the present invention to provide a railroad car identification system utilizing optical correlation techniques for providing an automatic, accurate and inexpensive identification system.

It is another object of the present invention to provide an identification system for moving objects using electro-optical auto-correlation techniques including compensation for luminosity of the identification symbol.

The above objects are achieved by utilizing identifying symbols arranged in the form of slanted striped patterns with correspondingly disposed reference masks and detectors which permit direct optical decoding while simultaneously performing error checks. The direct optical decoding is in a form suitable for use in standard teletype code or any other desired coding system.

These and other objects will become apparent by referring to the drawings in which:

FIG. 5 shows symbols representing letters and numerals with the respective letters and numerals superimposed thereon;

The present invention will be described for purposes of example with respect to a railroad car identification electro-optical correlation system. It will be appreciated from the following description that the present invention is equally applicable to other types of optical correlation with respect to moving objects for providing identification.

Figure 1:
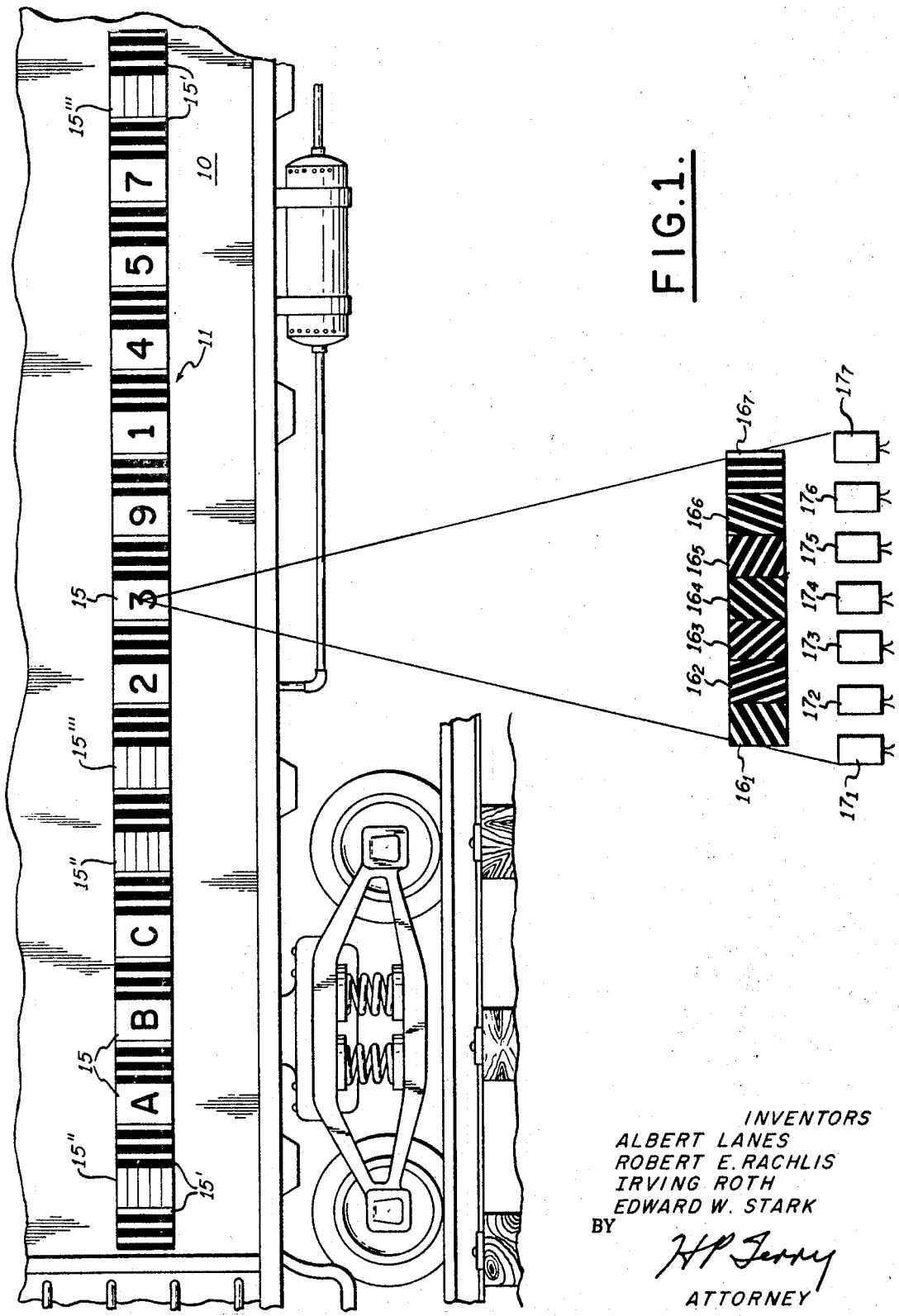
FIG. 1 is a schematic view in perspective showing a typical detection apparatus with respect to a railroad car.

Referring now to FIG. 1, the present invention provides a system for automatic identification of railroad cars 10 while in motion on the track. The system detects, identifies, and records indicia 11 representative of identifying serial letters and numbers of railroad cars 10 by means of detecting, identifying, and recording equipment 12 disposed, for example, about 5′ from the side of the railroad cars 10 while they are moving at speeds from 5 to 60 miles per hour or above. The identifying indicia 11 is disposed at a predetermined location on each railroad car 10 in order that the detecting equipment 12 may be disposed adjacent to the predetermined location for providing an output in any desired form such as standard teletype code which is particularly useful with respect to railroad operation. Each railroad car 10 is assigned an identification designation or indicia 11, for example, representative of three letters and seven numerals.

Figure 2:
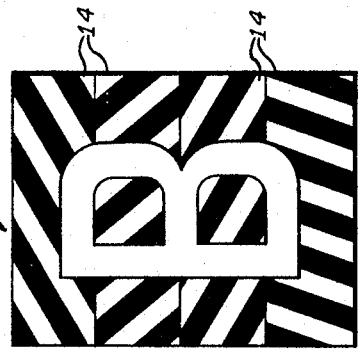
FIG. 2 shows the symbol for the letter B.

In accordance with the present invention, each letter in the alphabet and each numeral from 0 to 9 is defined by an identification symbol 15 represented by a pattern of alternate stripes of contrasting color having an overall height of 10″ and a width of 8″, for example, as shown in FIG. 2. The background of each letter or symbol 15 is divided into four equal horizontal portions or quarters 14 each approximately 2½″ in height. In each of these quarters 14, the stripe pattern consists of a group of stripes of equal width, for example ½″, of alternate dark and light areas; each group being disposed at a different predetermined angle. For purposes of railroad car identification, six angles have been found sufficient; five of the angles correspond to the five positions in the teletype code while the sixth angle is used as a parity check. By this arrangement of slanted striped patterns, direct optical decoding into standard teletype code is readily achieved.

Figure 3:
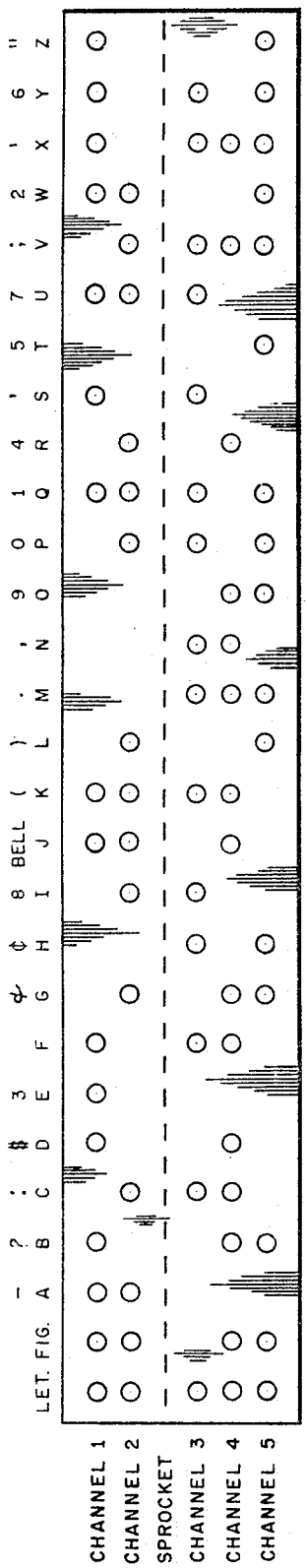
FIG. 3 shows a teletype tape having punched holes which represent letters, numerals and characters.
Figure 4:
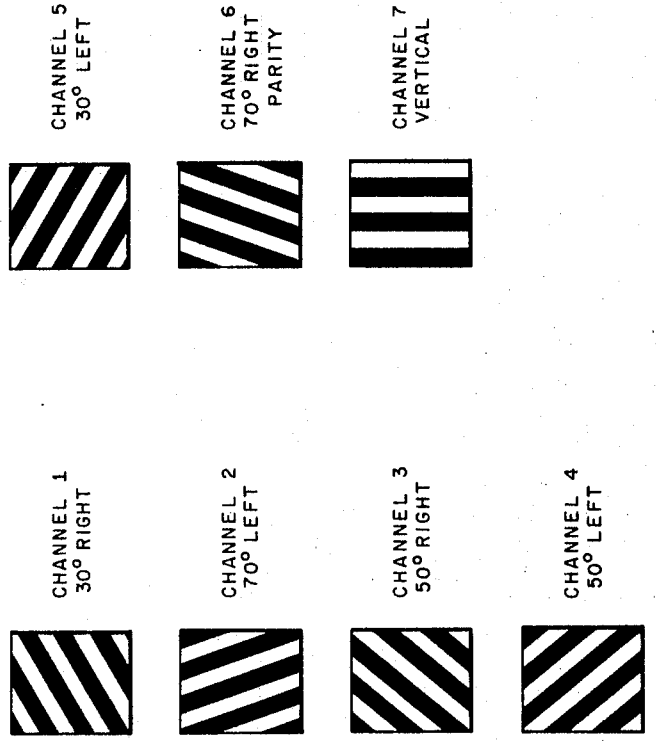
FIG. 4 shows patterns representing respective channels.

Referring to FIG. 3, the teletype code is shown with circles representing punched holes in the teletype tape corresponding to the respective letter, number or character. The teletype tape has five channels 1–5 arranged vertically, each channel corresponding to a position where a hole may be punched in the tape. Each letter and number on a railroad car 10 is encoded by means of a designated selection of one or more of the channels of the teletype punch tape by assigning to each of the five channels a direction for its associated stripe pattern. The stripe patterns and associated directions are shown in FIG. 4 and as viewed from the front appear as follows:

Channel 1—30° right
Channel 2—70° left
Channel 3—50° right
Channel 4—50° left
Channel 5—30° left
Channel 6—70° right
Channel 7—vertical The sixth channel provides a parity channel for a parity check. The parity channel is used to fill the background of the symbol 15 representing a letter or number when the number of channels normally required to define that letter or number is odd in order that the total number of channels activated is always even. This information is used in the system to check for possible errors.

The seventh channel is an intersymbol designation in the form of vertically disposed alternate light and dark stripes of equal width. The intersymbol 15′ is located before and after the total identification indicia 11 and between each symbol 15 representing a letter or number. The intersymbol 15′ is arranged to provide a signal larger in magnitude than any of the symbols 15. The appearance of this signal is used to indicate that a letter or numeral has just been sensed and should be entered into the storage subsystem (to be described). The intersymbol signal also serves the function of an automatic gain control (AGC) signal to adjust the gain of the channel 1–6 amplifiers (to be described) to compensate for variations in illumination, weather conditions and aging of the symbols 15 on the cars 10.

The alternate light and dark stripes representing the channels 1–6 and the intersymbol may be painted on the side of a railroad car 10 in a specified location using a special stencil or, for example, on dark colored cars only the light stripes may be painted with the dark background of the car itself providing the dark stripes, Reflective type paints may be utilized if desired but are not necessary for the satisfactory practice of the present invention.

As shown in FIG. 5, each letter of the alphabet, numbers 0 to 9, and other character symbols to be explained, may be encoded by means of a predetermined selection of one or more channels to provide the desired representation. The arrangement shown is obviously but one of many different combinations of skewed lines to define alpha-numerics and to define an alphabet and numeral system as shown. The skewed lines in this instance have been selected at the particular angles shown with at least 20 degrees difference between each channel of slanted lines to avoid ambiguities in the event of tilt, rotation, vibration, etc. of either the railroad car 10 or the detector 12. Any other suitable arrangement of angles to provide skewed lines which could be decoded without ambiguity would be satisfactory and in accordance with the present invention. In FIG. 5, each of the letters of the alphabet and numerals 0 to 9 are shown superimposed upon the combination of patterns defining the channels which represent that particular letter or numeral. It will be appreciated that it is not necessary to superimpose the letters or numerals for purposes of detection and identification as far as the present invention is concerned. However, for convenience of the human operators in identifying the railroad cars, the letters and numerals can be superimposed without any appreciable deterioration in the detection and identification capability of the system of the present invention.

Figure 6:
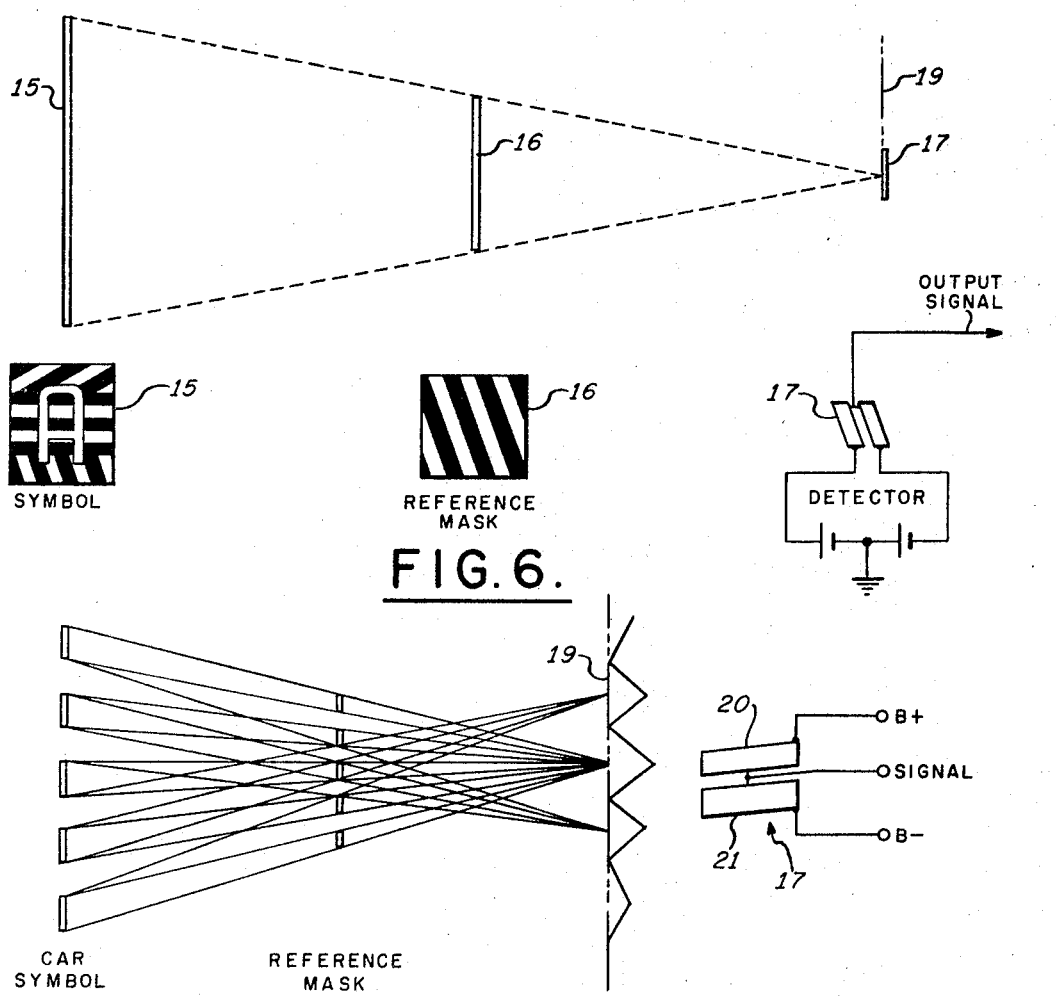
FIG. 6 is a schematic view showing the operation of a reference mask with respect to a symbol and a detector.

Detection of the railroad car identification number or indicia 11 is performed by optical correlation on the stripe patterns of the symbols defining the identification number. A typical detection channel is shown in FIG. 6 and will be explained with respect to a symbol 15 representing the letter A painted on the side of a railroad car. The single detection channel shown includes a reference transparency or mask 16 and a light detector 17. The reference transparency 16 has a stripe pattern consisting of equal width alternate transparent and opaque stripes disposed at the same angle as the pattern to be decoded with respect to one of the channels in the symbol 15, in this case, channel 2. The reference mask 16 is reduced in size with respect to the train-attached symbol 15 representing the letter A but it contains the same number of stripes identically arranged with respect to the aforementioned channel of the symbol 15. The reference mask 16 is held stationary at a predetermined location between the moving symbol 15 and the fixed detector 17. As the symbol 15 on the side of the car 10 moves past the reference mask 16, a correlation shadow pattern as shown more clearly in FIG. 7, in the form of a bar pattern disposed at the same angle as the stripes on the mask 16 and the train symbol 15 moves across the correlation plane 19. The light detector 17 is disposed in the correlation plane 19 and responsive to the correlation pattern as it moves across the detector 17. The detector 17 is illuminated with alternate light and dark bars inclined at the same angle as the symbol 15 and corresponding transparent portions of the reference mask 16. This generates an A.C. output signal in the photodetector 17 that is processed in a manner to be explained.

Figure 7:
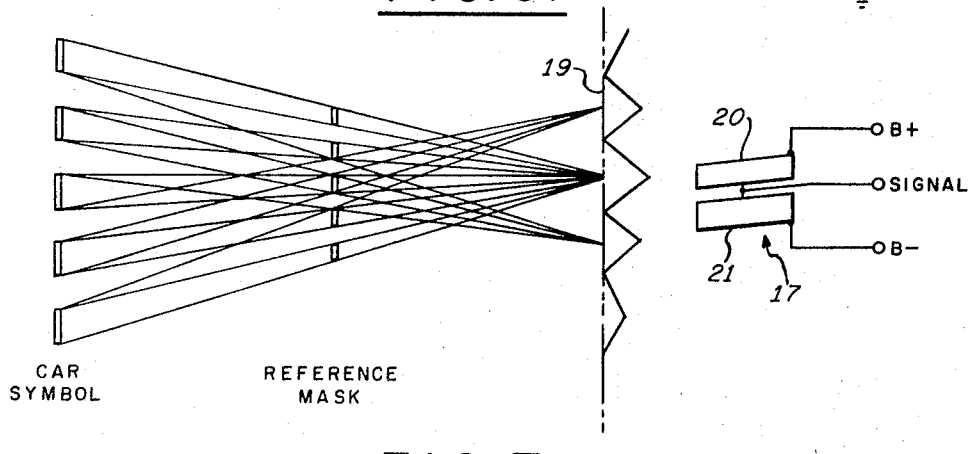
FIG. 7 shows auto-correlation intensity levels with respect to a pair of detectors.

Preferably, as shown in FIG. 7, the photodetector 17 consists of a pair of photodetector bars 20 and 21 aligned parallel to the bars of the intensity pattern and spaced with respect to each other so that one photodetector bar, for example 20, lies at a peak of the illumination intensity pattern while the other 21 is disposed at a valley or dark portion of the intensity pattern. By connecting the photodetector 20 to a source of positive voltage B+ and the photodetector 21 to a source of negative voltage B−, a differential output is provided from the common signal output terminal. This arrangement results in rejection of common mode disturbances such as uniform changes in light level, broad field light transients, temperature variations etc. to the degree of matching of the responses of the photodetector bars 20 and 21 with respect to each other.

Figure 8:
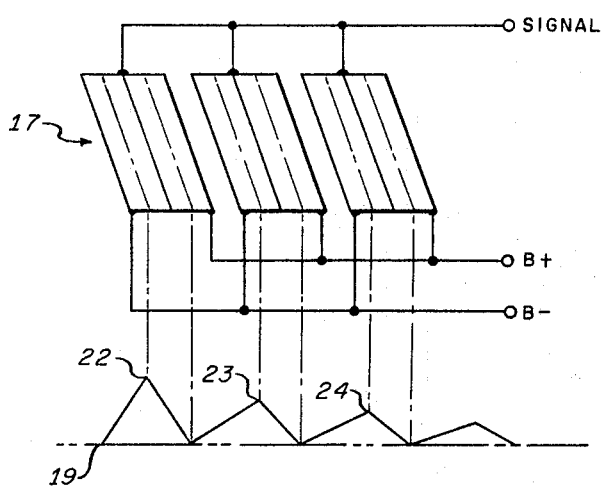
FIG. 8 shows auto-correlation intensity levels with respect to a plurality of pairs of detectors.

As shown in FIG. 8, the output signal from the detector 17 may be further enhanced by utilizing a plurality of pairs of photodetectors in which a pair is responsive not only to the intensity pattern at the peak auto-correlation point 22 but additional pairs are responsive to the intensity at the other correlation points 23 and 24.

If the direction of the stripes of the train symbol 15 does not coincide with the direction of the stripes of the reference mask and the detector 17, the amplitude of the detector ouput is considerably smaller than the matched case where they are all aligned. The outputs in the nonmatched case may be considered system noise. Since the noise outputs are smaller in amplitude and of fixed magnitude with respect to the desired signal (approximately 5 to 1), a threshold may be set on the detector output which inhibits the noise output from entering the processing circuits, in a manner to be described.

As explained above, the identification indicia 11 for each particular railroad car 10 is in the form of symbols 15 representing three letters and seven numbers, as shown in FIG. 1. In addition, a letter coding symbol 15″ is located before and after the three symbols 15 representing letters and a figure coding symbol 15‴ is located before and after the symbols representing numbers. As will be more fully explained, use of the letter and figure coding symbols 15″ and 15‴, respectively, are necessary in conjunction with teletype code because of two reasons. One, certain of the letters and numbers have the same symbol pattern, e.g., 3 and E and it is necessary to distinguish therebetween to avoid ambiguities; and second, the symbols 15″ and 15‴ are also used to determine the direction of travel of the railroad car 10 in order that a single detector may be used irrespective of the direction of travel to provide an output on the teletype that always reads in the same direction. The intersymbol 15′ is located before, after and between each of the symbols 15, 15″ and 15‴ of the identification indicia 11.

Figure 13:
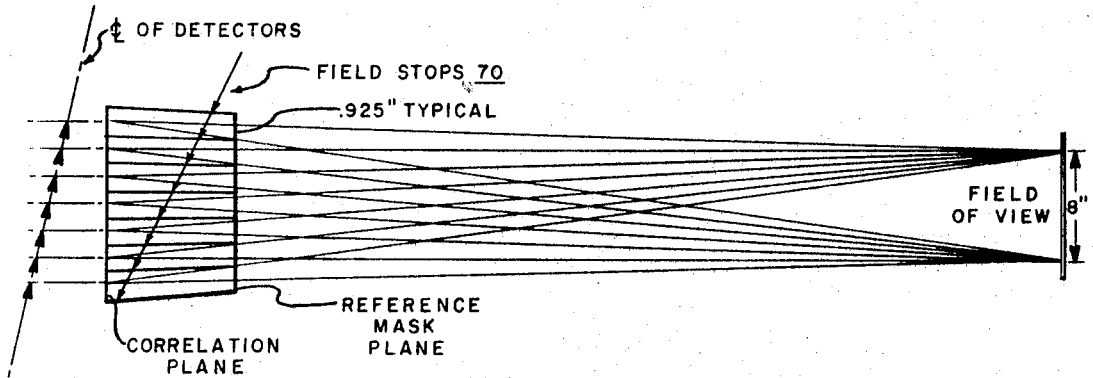
FIG. 13 is a schematic plan view showing the simultaneous focussing of the detectors and masks with respect to a field of view representing a symbol.

Referring to FIGS. 1, and 13, as the railroad car 10 travels past the detecting equipment 12, the masks 16 and detectors 17 are so constructed and arranged as to focus upon the same field of view such that each symbol is simultaneously scanned by all the detectors with the symbols being sequentially scanned as the train passes the detecting equipment 12. The masks 16 and detectors 17 representing the channels 1–7 are arranged adjacent to each other in order that the detectors 17 associated with the particular masks 16 which correspond to the stripe patterns representing a symbol 15 are activated and provide signals having a magnitude approximately five times greater than the noise signals from the detectors 17 having masks 16 that do not correspond to the patterns in that particular symbol 15.

With respect to the system schematics of FIGS. 9 to 12, the subcharacters of the reference numerals will indicate the channel with which the element is associated.

Assuming that the symbol 15 being viewed represents the number 3, the upper quarter of the symbol 15 representing the number 3 has a slanted striped pattern 30 degrees right corresponding to that of the reference mask $16_1$. When this symbol 15 is in the field of view of the detector $17_1$, there will be maximum correlation between the upper quarter of the symbol 15 representing the number 3 and the mask $16_1$ and the detector $17_1$. The detector $17_1$ then provides an output approximately five times greater than that provided by any of the other detectors except that of the parity detector $17_6$ whose associated mask $16_6$ corresponds with the pattern 70 degrees right on the lowest quarter of the symbol 15. The middle quarters of the symbol 15 representing the number 3 have a horizontal stripe pattern and do not correlate with any of the masks 16.

The signal from the detector $17_1$ preferably is connected to a detector frequency gain equalizer $30_1$ which is an amplifier having a rising gain versus frequency characteristic that compensates for the decreasing frequency response characteristic of the detector $17_1$ in order that the signal amplitude from the equalizer $30_1$ remains constant in spite of variations in the speed of the railroad car 10. The equalizer $30_1$ is connected to an automatic gain control (AGC) amplifier $31_1$ whose function is to provide a relatively constant output signal over a large dynamic range of input signals due to variations in ambient light levels and deterioration of the symbols 15 painted on the sides of the cars 10. This is desirable in order to perform subsequent operations on these signals using circuitry of minimum dynamic range. The relative signal levels in all signal channels is thereby compensated in order to accurately distinguish true auto-correlation signals from spurious cross-correlation noise. To do this, the intersymbol channel 7 develops a D.C. signal from a rectifier and filter circuit 29 that is responsive to the output of the equalizer $30_7$. The rectifier and filter circuit 29 comprises a half wave rectifier coupled to an R-C type low pass filter whose time constant is relatively long so as to block the lowest signal frequency encountered in channel 7 in order to provide an AGC D.C. voltage without ripple, the frequency being a function of car velocity. This AGC D.C. signal is therefore a function of the ambient light level and relative contrast of the striped patterns defining the intersymbols 15′ which are representative of the condition of the overall indicia 11. This D.C. signal is connected in parallel to all other signal channel AGC circuits to control the gain, in a manner to be described subsequently.

The output from the AGC amplifier $31_1$ is an A.C. wave form compensated for vehicle speed and AGC having the correlation characteristics as represented by the waveform shown. This signal after being amplified and rectified in the amplifier and half-wave rectifier $32_1$ is connected to an inverter and comparator $33_1$ and to a diode "OR" gated capacitor type peck detector 34. The charge on the capacitor of the peak detector 34 is proportional to the largest signal occurring within the seven channels. The output from the peak detector 34 is connected to each of the comparators such as $31_1$ where the signal is used as a bias signal input in the comparator circuit in each channel. Thus, the rectified signal having a wave shape as shown from the amplifier and rectifier 32′ is compared to the largest signal within the seven channels. Nominally, if the rectified signal is at least half as large as the largest signal from the peak detector 34, it is passed through the comparator $33_1$ as a valid auto-correlation signal. If the rectified signal is below this threshold level, the rectified signal is suppressed indicating that the particular symbol signal is not present at this time.

Signals that pass the inverter and comparator circuit $33_1$ are inverted thereby and A.C. coupled to a Schmitt trigger $35_1$ which produce a rectangular wave of constant amplitude for each signal pulse. The rectangular pulses are connected to trigger a monostable (single shot) multivibrator $36_1$ which provides a constant energy output pulse for each input pulse. The output pulses from the multivibrator $36_1$ are connected to an R-C type integrator $37_1$ which has a long time constant relative to the signal input rate in order that the voltage on its capacitor is linear with respect to the number of signal pulses received and is independent of the railroad car speed. When a predetermined number of pulses have been stored in the integrator $37_1$, the threshold of a Schmitt trigger $38_1$ connected thereto is exceeded and a voltage output is provided from the Schmitt trigger $38_1$ in the form of a step function as shown. This step function is connected to a 14 bit shift register $39_1$. The requirement of several pulses being needed to reach the threshold established by the Schmitt trigger $38_1$ greatly reduces the false alarm rate from that which it would be if only a single pulse were used. The information is entered into the shift register $39_1$ from the Schmitt trigger $38_1$ at the command of a shift pulse which is generated by a single shot multivibrator $40_7$ in the intersymbol channel 7. The information thus gathered from each channel is stored in the respective shift registers $39_{1-6}$. It is now necessary to discharge the peak detector 34 and signal integrators $37_{1-7}$ in each channel in order to be able to detect the next input signal from the respective detectors $17_{1-7}$. It will be appreciated that channels 2 to 7 are substantially identical to the above-described channel 1 and operate in parallel in a simular manner.

To accomplish the discharge and subsequent detection mentioned above, the symbols 15, 15', 15", and 15''' are placed on the railroad car in a particular manner as shown in FIG. 1. Immediately before and after each symbol 15 representing a letter or a number is placed an intersymbol 15' having vertical stripes. As the indentification indicia 11 on the railroad car 10 first enters the field of view, the detecting equipment 12 initially sees only this intersymbol 15' which is processed through the intersymbol mask $16_7$ and its associated detector $17_7$ in a similar fashion, as described for the other channels 1–6, except that the output of the Schmitt trigger $38_7$ is connected to a monostable (single shot) mulivibrator $40_7$ instead of to a shift register as in channels 1–6. Excitation of the Schmitt trigger $38_7$ fires the single shot multivibrator $40_7$ which provides a shift command signal to each of the shift registers $39_{1-6}$ to enter the contents of all the channels 1–6 into their respective shift registers. The trailing edge of the signal from the single shot multivibrator $40_7$ triggers a second single shot multivibrator $41_7$ which then causes all the signal integrators $37_{1-7}$ and the peak detector 34 to be discharged.

The intersymbol channel 7 is also discharged when any signal channel 1–5 or the parity channel 6 reaches threshold of its respective Schmitt trigger. This is done by connecting the outputs of the Schmitt triggers $38_{1-6}$ to respective R-C type differentiating circuits $68_{1-6}$ which in turn are connected to an OR gate 69. The differentiating circuits $68_{1-6}$ each provide a positive pulse in response to the leading edge of the step function output of the respective Schmitt triggers $38_{1-6}$. This pulse is passed through the OR gate 69 and is connected to discharge the intersymbol integrator $37_7$ thereby preventing spurious signals from the intersymbol channel 7 during the time symbols other than the intersymbol 15' are being scanned. In other words, there is a complementary action; the intersymbol signal causes an information storage and erase command for the signal channels 1–5 and parity channel 6 at one time while the channels 1–6 cause erasure of residual signals in the intersymbol channel 7 at another time.

Trains may travel past the detecting equipment 12 in either direction, however, it is preferable that the recorded data always be presented in the forward direction, i.e., the letters should precede the numbers. This is accomplished by the use of the shift registers which can be read out either forwards or backwards. The signal for forward or backward read out may be obtained directly from the identification indicia 11 by preceding the letter and numeral symbols by code symbols. The letter symbols are preceded and followed by letter code symbols 15" while the numeral symbols are preceded and followed by numeral code symbols 15'''.

Referring now to FIGS. 1, 9, 10 and 11, it is initially assumed that a railroad car 10 is travelling in the direction of the arrow to the left as viewed in FIG. 1, and thus a letter code symbol 15" comes within the field of view of the detecting equipment 12 before a numeral code symbol 15'''. The letter code symbol 15" has five patterns corresponding to masks $16_{1-5}$ thereby providing correlated input signals to detectors $17_{1-5}$ which are passed through channels 1–5 to provide signals simultaneously from the Schmitt triggers $38_{1-5}$ to a letter code symbol AND gate 45 shown in FIG. 11. With no inhibit signal from the numeral code signal 15''' to the AND gate 45, a bistable multivibrator 46 connected to the output of the AND gate 45 is flipped to provide an output to a forward read out AND gate 48. A clock pulse source 47 is also connected to an input of the AND gate 48 and provides clock readout pulses in the form of a forward readout command signal to the shift registers $39_{1-5}$ which causes them to read out in the forward direction when both inputs to the AND gate 48 are energized. The bistable multivibrator 46 is also connected to an input terminal of a number code symbol AND gate 50 to simultaneously provide an inhibit signal which inhibits the AND gate 50.

When the railroad car 10 is travelling in the opposite direction, i.e., to the right as viewed in FIG. 1, the number code symbol 15''' will be the first code symbol scanned and in a similar manner signals are provided from the Schmitt triggers $38_1$, $38_2$, $38_4$ and $38_5$ to the number code symbol AND gate 50 which in the absence of an inhibit signal provides an output signal to a bistable multivibrator 51 that is connected to a backward readout AND gate 52. The output of the Schmitt trigger $38_3$ provides an inhibit signal to an input terminal of the AND gate 50. The backward readout AND gate 52 is also responsive to the clock pulses from the source 47. A backward readout command signal is provided to the shift registers $39_{1-5}$ when both inputs to the AND gate 52 are energized such that the information on the shift registers $39_{1-5}$ is read off in a backward direction. Since the information is read from the car 10 in a backward sense and the shift registers are also readout backwards, the information is presented or punched in a forward direction. The output of the bistable multivibrator 51 also provides an inhibit signal to the AND gate 45. This method does not require any auxiliary information or equipment being available in order to sense the direction of train travel.

Figure 9:
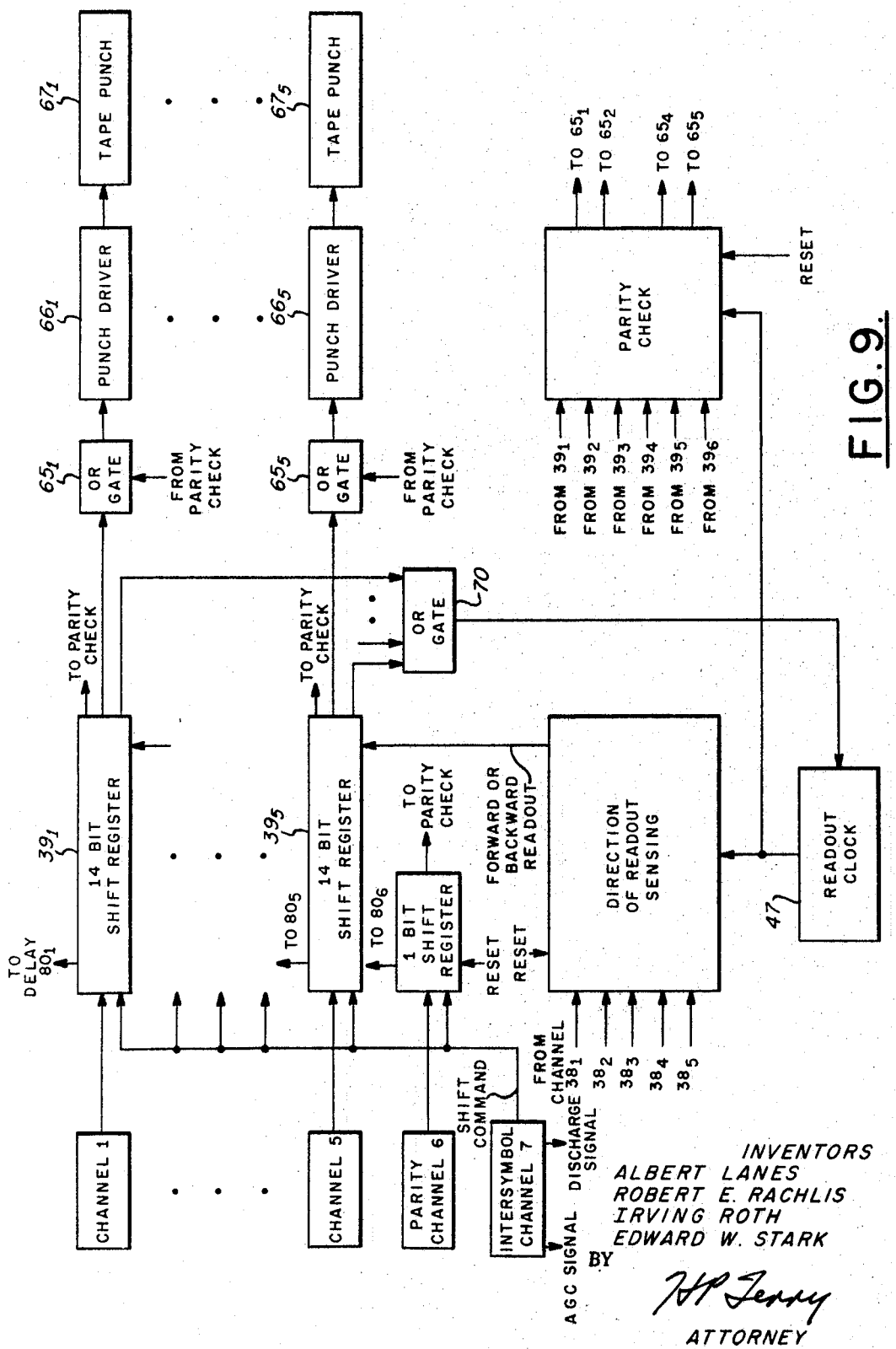
FIG. 9 is a system schematic diagram showing the system in block form.
Figure 10:
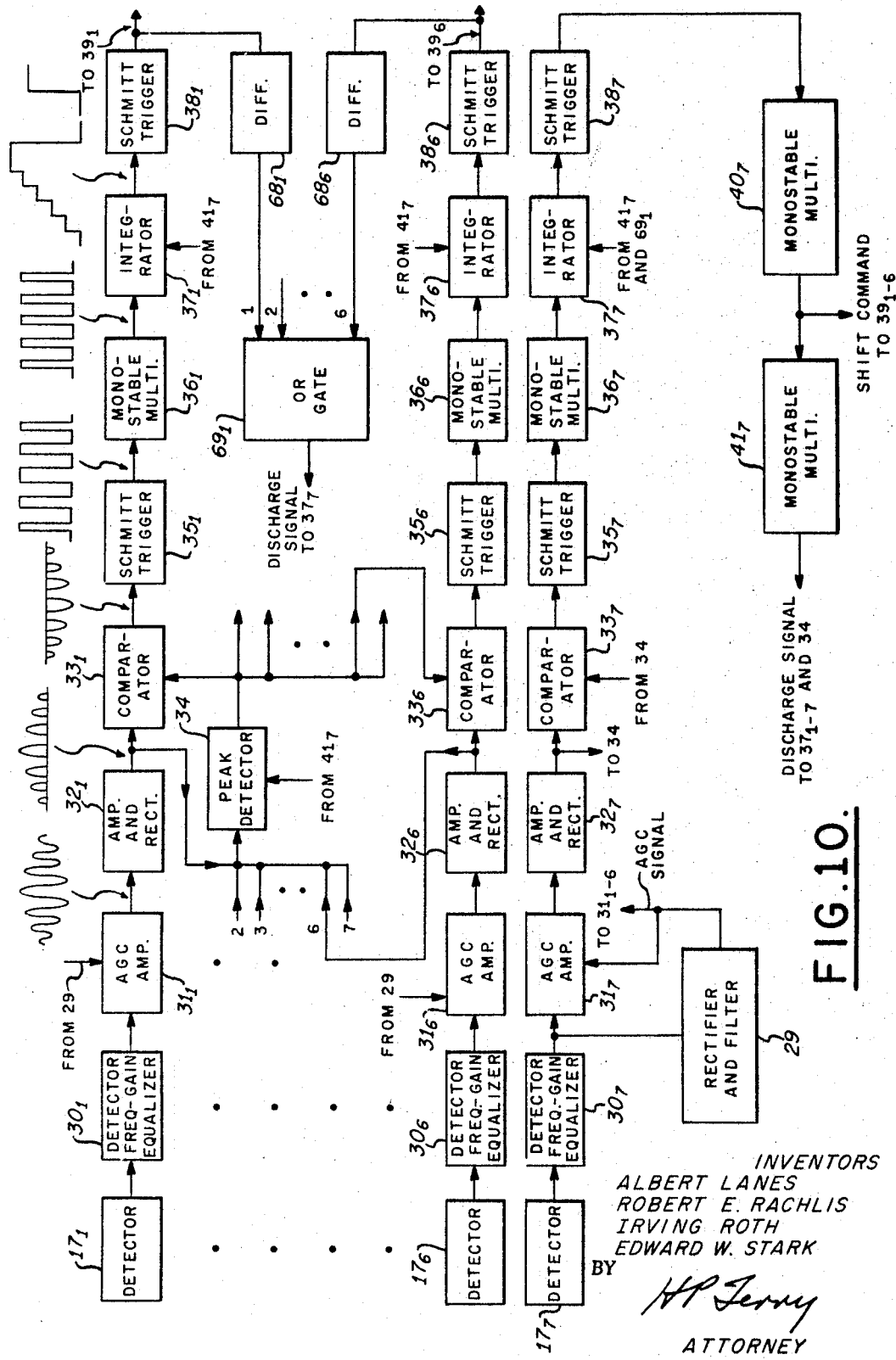
FIG. 10 is a partial system schematic diagram showing the channels 1 to 7 in greater detail.
Figure 11:
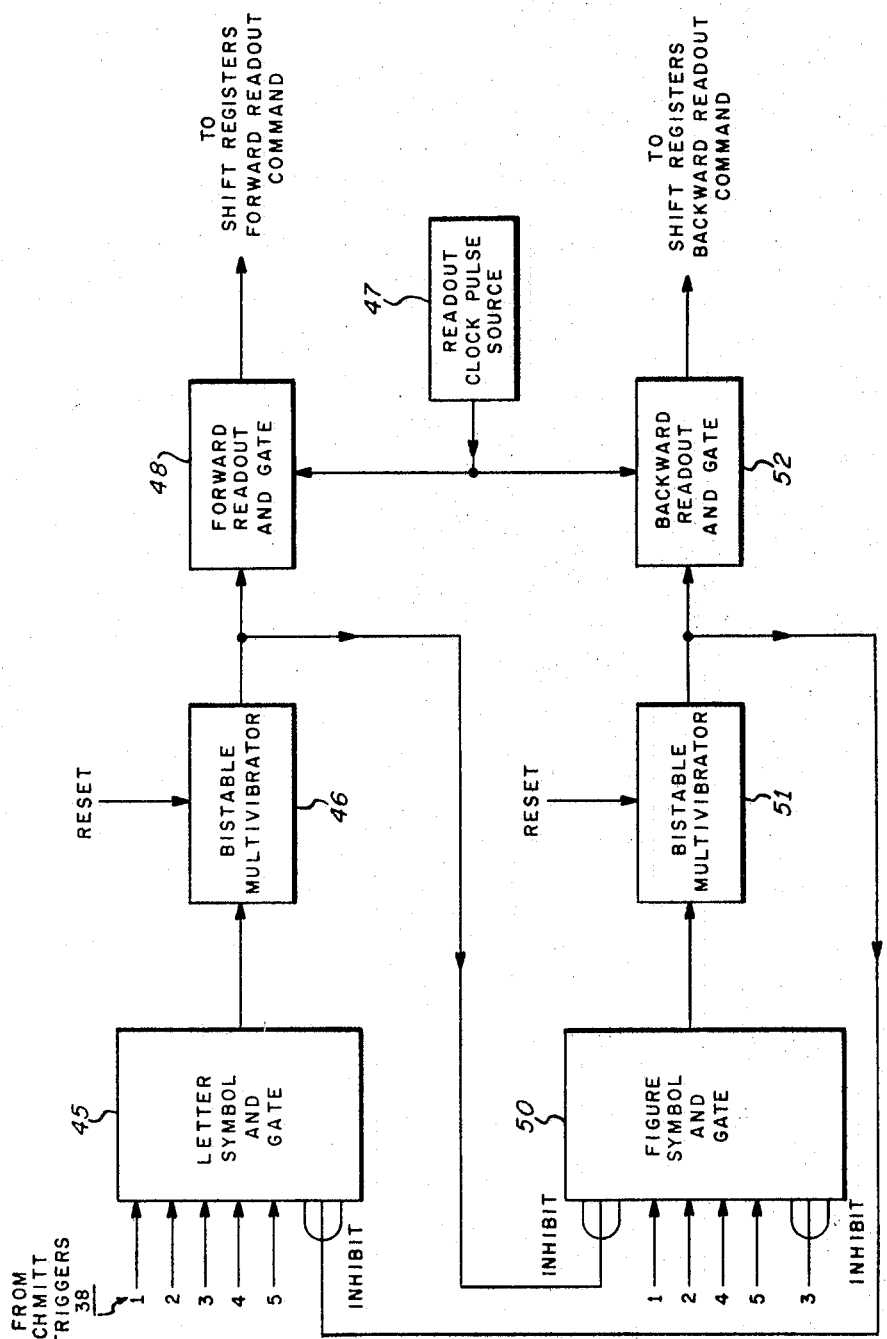
FIG. 11 is a partial system schematic diagram showing the direction of readout sensing.

Referring to FIG. 9, each of the shift registers $39_{1-5}$ are connected through respective OR circuits $65_{1-5}$ to respective punch drivers $66_{1-5}$ which in turn actuate respective tape punches $67_{1-5}$. The information from the shift registers $39_{1-5}$ is always punched in a forward direction on the teletype tape for the reasons explained above.

The repetition rate of the clock pulses from the read out clock 47 determines the rate at which the information is read out from the shift registers $39_{1-5}$ and this in turn is a function of the maximum rate at which the tape punches $67_{1-5}$ can operate.

Figure 12:
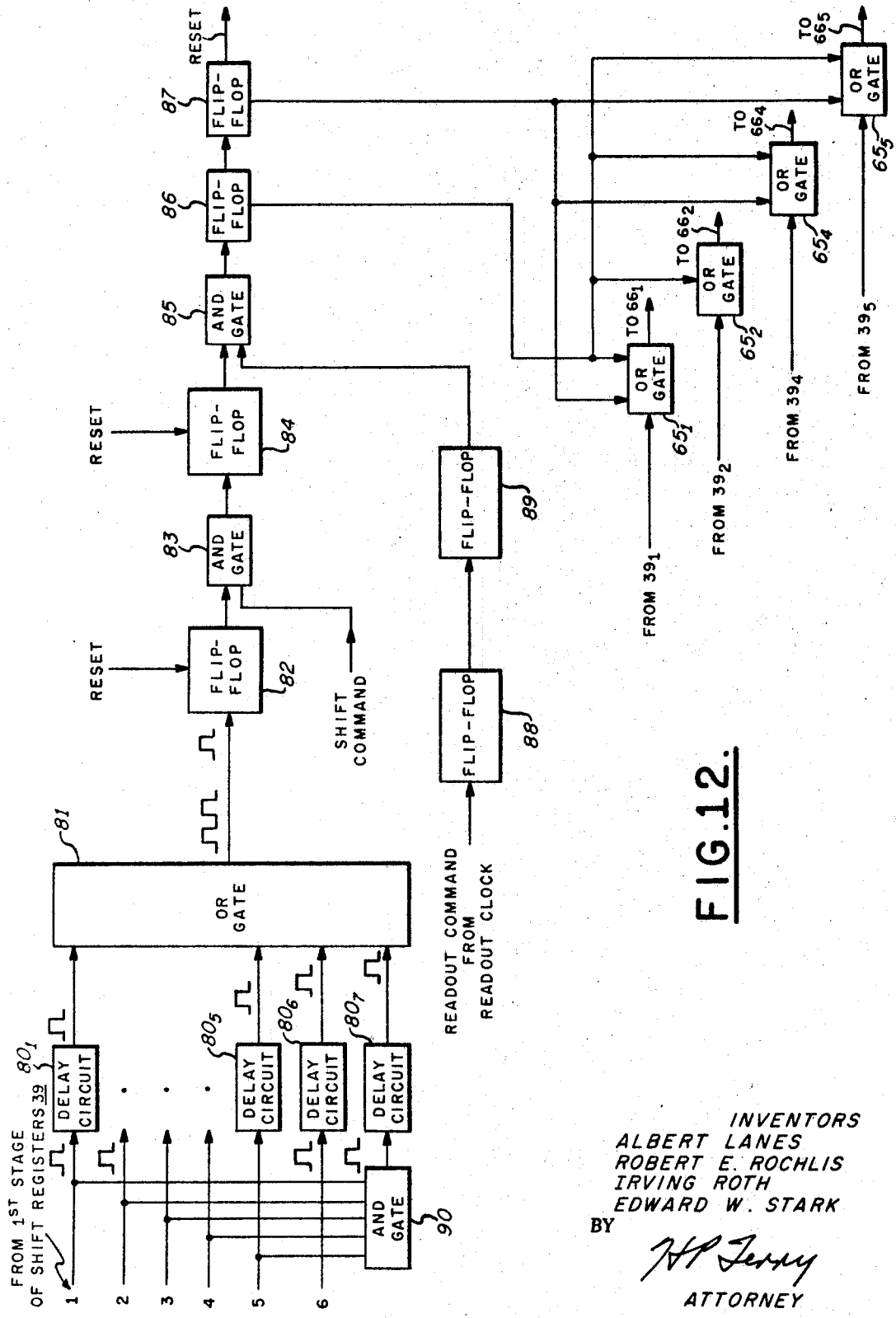
FIG. 12 is a partial system schematic diagram showing the parity check.

Referring now to FIG. 12, a parity check is provided that indicates when an error has been committed by printing on the teletype tape the coded signal for question mark after the erroneous signal has been punched out.

This is accomplished by using the output of the first stage of each of the shift registers $39_{1-5}$ and the output of the parity register $39_6$. Each of the shift register outputs is delayed in time a specific amount in respective delay circuits $80_{1-6}$ so that the delayed outputs, as shown by the waveforms, enter a summing OR gate 81 sequentially. The summing OR gate 81 sums all the signals such that a pulse train appears at its output. This train of pulses is connected to a bistable (flip-flop) multivibrator 82 which changes state with each pulse. If an output appears from the flip-flop 82 at the end of the pulse train, an odd number of pulses must have entered the flip-flop 57 thereby indicating that parity has not been met since all the symbols 15 have an even number of channels. If the flip-flop 82 has an output when the next shift command occurs, it indicates an error has been committed, and the flip-flop output is fed into an AND gate 83 with the shift command signal to indicate the fact that the letter or number entering the shift registers $39_{1-5}$ and the parity one bit shaft register $39_6$ does not meet the even parity test. The output of the AND gate 83 is connected to the input of a self-latching flip-flop 84. When there is an output from the AND gate 83, indicating parity has not been met, the self-latching flip-flop 84 turns on storing the fact that an error has been committed. Subsequent errors during the total letter and number sequence have no effect. If more than one error occurs, only the first error will be stored indicating parity has not been met. When any one of the fourteen bit shift registers $39_{1-5}$ fills, readout of all the shift registers is initiated by means of an OR gate 70. The OR gate 70 is responsive to the outputs from the shift registers $39_{1-5}$ and is connected to the readout clock 47 to initiate readout when one of the shift registers $39_{1-5}$ fills. The output of the readout clock is connected to the input of a single shot multivibrator 88. When the first readout clock pulse occurs, the single shot multivibrator 88 is triggered, and its output is a pulse whose width is fourteen readout command pulses wide. Thus, when the fourteen bit shift registers $39_{1-5}$ are empty, it is indicated by the single shot multivibrator 88 returning to its original state. This change of state triggers the following flip-flop 89 whose output is connected to the AND gate 85. The output of the flip-flop 84 is also an input to the AND gate 85. If at the fourteenth count, which indicates the end of the readout cycle of the shift registers $39_{1-5}$, flip-flop 84 has an output. The output of flip-flop 84 and flip-flop 89 will pass a signal through the AND gate 85 and produce an output therefrom which triggers a single shot multivibrator 86. The output of the single shot multivibrator 86 is routed to the punch drivers $66_1$, $66_2$, $66_4$, $66_5$ through the respective OR gates $65_1$, $65_2$, $65_4$, $65_5$. This causes the tape punches $67_1$, $67_2$, $67_4$, $67_5$ to punch in teletype code the figure code cymbol $15'''$. The output of the single shot multivibrator 86 is also connected to trigger a single shot multivibrator 87 after a short delay. The output of the single shot multivibrator 87 is routed through OR gates $65_{1,4,5}$ to energize the punch drivers $66_{1,4,5}$ which causes the tape punches $67_{1,4,5}$ to punch a question mark in teletype code. Thus, after an erroneous signal has been punched out, a question mark will follow.

The output of the single shot multivibrator 87 is also used to provide a reset signal to reset all the shift registers $39_{1-6}$, bistable multivibrators 46 and 51 in the direction sensing system, and the flip-flops 82 and 84 in the parity check subsystem. In checking parity for the letter code symbol $15''$ there is an exception, its teletype code utilizes all five channels 1-5. A parity symbol is not added to achieve even parity because it would cause an undue reduction in detector signal output. Instead a separate simple logic circuit 90 is added. When there are simultaneous outputs from the first stage of shift registers $39_{1-5}$, the outputs are entered into an AND gate 90 whose output is delayed by a delay $80_7$ which adds one pulse to the OR gate 81, in order that the pulse train therefrom will continue to have an even number of pulses and parity will be met.

Referring to FIG. 9, as explained above, as each letter or number of the identification indicia 11 is sensed, it is placed in one of the shift registers $39_{1-5}$. It will be appreciated that this information could be punched directly onto a paper tape strip by use of a high speed paper tape punch. However, for trains moving at 60 miles an hour, this would require a punch capable of providing 88 operations per second, thus necessitating an expensive high speed punch. By use of an intermediate storage in the shift registers, the required operating rate of the paper tape punch is decreased to less than 20 operations per second since the information can be read out to the punch driver during the time that the railroad car is traversing the detecting equipment when no symbols are being processed thereby permitting a considerable saving in the cost of the punch unit. The use of the shift registers for intermediate storage also permits permanent recording of the serial number or identification indicia of the car in proper sequence independent of the direction of motion of the car.

Figure 14:
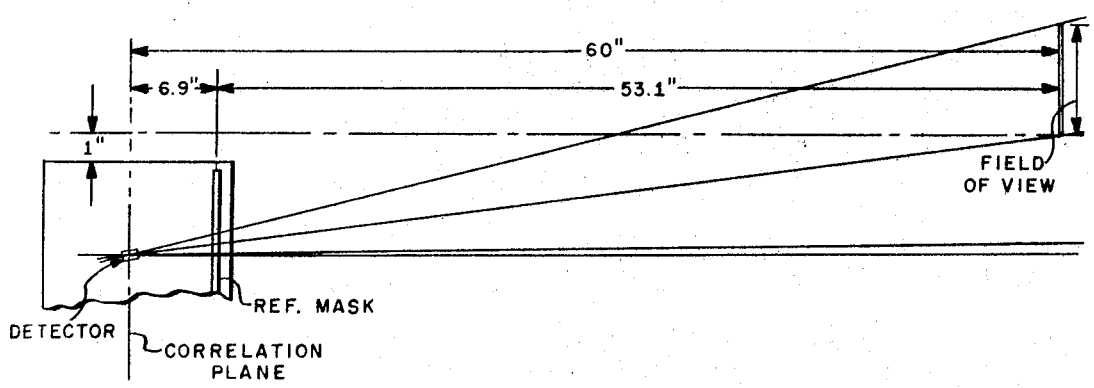
FIG. 14 is a schematic plan view showing the leftward focussing of a detector and mask.
Figure 15:
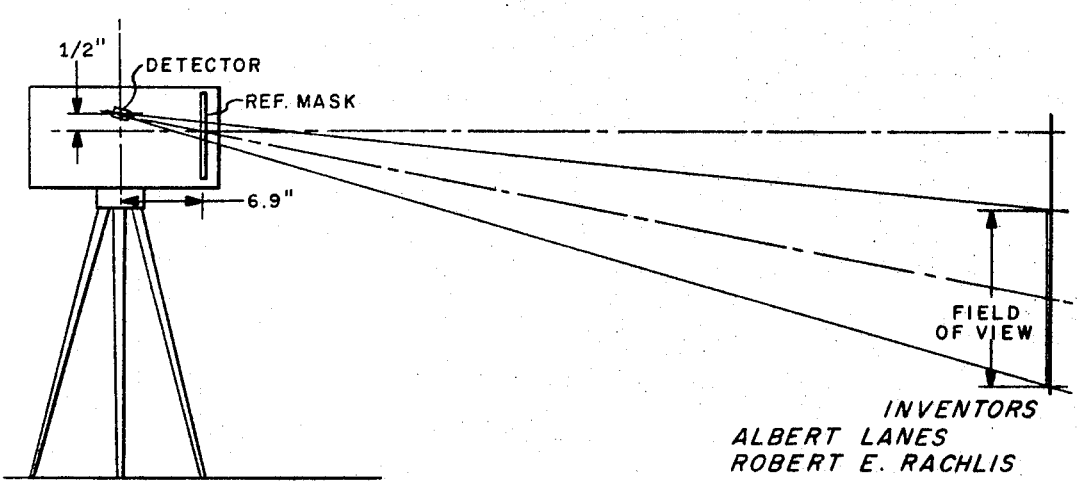
FIG. 15 is a schematic elevation showing the downward focussing of the detector and mask of FIG. 14.

A typical installation of the detecting equipment 12 with respect to a railroad car 10 is shown in FIGS. 13, 14 and 15 which are not to scale for purposes of emphasis. The field of view as shown in these figures encompasses the dimensions of a symbol with allowance for variations during operation due to height, loading, vibration, etc. The field of view is skewed to one side and downward to prevent specular reflection off the surface of the symbol to cause undesirable glare on the reference masks 16. This precaution prevents uncorrelated light from flooding the detectors 17 due to the undesirable glare. For similar reasons, the masks 16 are enclosed in a hooded housing. As shown in FIG. 14, the detectors $17_{1-7}$ and reference masks $16_{1-7}$ are arranged so that all of the detectors are focused simultaneously on the same symbol and have substantially the same field of view. Separators or field stops 70 disposed between adjacent detectors and their respective masks prevent undesirable cross-correlated light from entering the masks and causing spurious signals on the detectors.

A typical system which has been successfully tested has the following characteristics. The symbol painted on the side of the car is 8" wide by 10" high, with ½" wide stripes. The distance from the detectors which are mounted in the correlation plane to the symbols is 60". The distance between the detector plane and the reference plane is 6.9". This dimension was arrived at by considering the spacing between the two sides of the differential detector, and the requirement that a positive correlation peak fall on one side of the detector and negative correlation valley on the other, together with the fact that there are the same number of stripes in both the reference mask and the symbol. This automatically defines the horizontal field of view as being 8" wide, i.e., the width of one symbol.

The detectors are 1.05" on center, and the six adjacent reference masks are each 0.925" wide. This determines the field of view for each detector as being the same at the signal plane. The width of the stripes of the reference masks is .0575". The dimensions stated above provide only one of many combinations suitable to achieve the desired auto-correlation function and is cited for purposes of example only and is not intended to be restrictive of the present invention.

The detecting equipment 12 also includes an automatically actuated light source which illuminates the symbols by conventional means not shown when the ambient light level becomes too low.

For symbols which are defined by only one or two patterns, such as "A," "D," "E," etc., horizontal strips of alternately contrasting colors are used to fill the central two quarters of the symbol to preserve and maintain the average transmissivity. The horizontal pattern does not auto-correlate with any of the other patterns and therefore does not generate any A.C. signals or noise.

The present invention has been described with respect to light being reflected from the symbols and transmitted through the masks to the detectors. It will be appreciated that the symbols could be illuminated from behind and the light transmitted through the transparent portions of the symbols. Furthermore, although light energy is employed in the preferred embodiment disclosed herein, it will be understood that other forms of energy may readily be employed in the broader aspects of this invention. The terms transmission and tranmissivity as used in this description are intended to be generic to either reflected or transmitted energy.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An optical correlation identification system comprising,
   (a) identification indicia having a plurality of symbols,
   (b) each of said symbols having a plurality of patterns, the combination of which defines each of said symbols,
   (c) said patterns being characterized by alternate stripes of contrasting transmissivities, said stripes being of equal width with respect to each other and each of said patterns having a plurality of stripes skewed at the same angle different from that of the stripes forming any other pattern,
   (d) a plurality of reference masks corresponding to the number of said patterns and in spaced location with respect to said identification indicia,
   (e) each of said masks having a correspondingly disposed pattern defined by corresponding stripes of contrasting transmissivities and aligned with its associated symbol pattern,
   (f) a plurality of detector means cooperative with respective reference masks and said identification indicia and responsive to the relative movement of said identification indicia with respect to said reference masks for providing output signals representative of a function of the optical correlation therebetween, and
   (g) signal utilization means responsive to said output signals exceeding a predetermined value.

2. In a system of the character described in claim 1 in which certain of said symbols are arranged to precede and follow certain other symbols and said signal utilization means includes means responsive to the position of said certain symbols for providing a bidirectional readout capability.

3. An optical correlation identification system comprising,
   (a) a predetermined plurality of patterns for defining a plurality of identification symbols,
   (b) each of said symbols being defined by at least one of said patterns,
   (c) said patterns being characterized by alternate stripes of contrasting transmissivities with said stripes being of equal width with respect to each other and each of said patterns have its stripes disposed at a predetermined angle different from that of any other pattern,
   (d) a plurality of reference masks corresponding to the number of said patterns in spaced location with respect to said identification symbols,
   (e) each of said masks having a correspondingly disposed pattern defined by corresponding stripes of contrasting transmissivities and aligned with its associated pattern,
   (f) a plurality of detector means cooperative with respective reference masks and said identification symbols and responsive to the relative movement of said identification symbols with respect to said reference masks for providing output signals representative of a function of the optical correlation therebetween, and
   (g) signal utilization means responsive to said output signals exceeding a threshold value.

4. An optical correlation identification system comprising,
   (a) a predetermined plurality of patterns for defining a substantially larger plurality of identification symbols,
   (b) each of said symbols being defined by at least one of said patterns,
   (c) said patterns being characterized by alternate stripes of contrasting transmissivities with said stripes being of equal width with respect to each other and each of said patterns have its stripes disposed at a predetermined angle different from that of any other pattern,
   (d) a plurality of reference masks corresponding to the number of said patterns in spaced location with respect to said identification symbols,
   (e) each of said masks having a correspondingly disposed pattern defined by corresponding stripes of contrasting transmissivities and aligned with its associated pattern,
   (f) detector means cooperative with respective reference masks and said identification symbols and responsive to the relative movement of said identification symbols with respect to said reference masks for providing detector output signals representative of a function of the optical correlation therebetween,
   (g) signal processing channels responsive to respective detector means,
   (h) one of said signal processing channels being responsive to signals from certain of said symbols for providing an automatic gain control signal representative of a function of the ambient light level and relative contrast of the stripe patterns of all of said symbols,
   (i) automatic gain control responsive means in each of said channels for compensating said detector output signals in accordance with the ambient light level and relative contrast of said stripe pattern for providing an automatic gain control compensated signal,
   (j) peak detector means responsive to said automatic gain control compensated signal for providing a peak signal representative of the largest of said automatic gain control compensated signals,
   (k) comparator means responsive to said automatic gain control compensated signal and said peak signal for providing a comparator output signal when said automatic gain control compensated signal exceeds a predetermined value with respect to said peak signal; and
   (l) signal utilization means responsive to said comparator output signal.

5. In an optical correlation identification system of the character described in claim 4 in which said detector means has a decreasing gain versus frequency characteristic and further including detector frequency gain compensating means responsive to said detector output signals and having a rising gain versus frequency characteristic that compensates for the decreasing frequency response characteristic of said detector means for providing a frequency compensated signal that remains constant in spite of variations in the relative speed of said identification symbols with respect to said reference masks.

6. In a system of the character described in claim 4 in which said signal utilization means further includes,
   (a) integrating means responsive to said comparator output signals for providing an integrated output representative thereof,
   (b) Schmitt trigger circuit means responsive to said integrated signal for providing a step function when said integrated signals reach a predetermined threshold, and
   (c) said signal utilization means being responsive to said step function thereby greatly reducing the false alarm rate from that which it would be if only a single comparator output signal were used.

7. In a system of the character described in claim 4 in which each of said symbols is defined by a predetermined number of said patterns and further including parity check means responsive to said predetermined number of patterns for indicating parity has not been met when other than said predetermined number of patterns is measured with respect to each of said symbols.

8. In a system of the character described in claim 4 in which said reference masks and associated detectors are so constructed and arranged as to simultaneously focus on substantially the same field of view at the same time.

9. In a system of the character described in claim 8 in which said reference masks and associated detector means are simultaneously focussed downward and to the left to prevent excessive spectral reflection.

10. An optical correlation identification system comprising,
 (a) a predetermined plurality of patterns for defining a substantially larger plurality of identification symbols representing letters, numerals, characters and code devices, a combination of which define identification indicia, said code devices including a letter symbol, a figure symbol and an intersymbol,
 (b) said identification indicia usually consisting of a group of letters and a group of numerals with said group of letters preceded and followed by said letter symbol and said group of numerals preceded and followed by said figure symbol with said intersymbol preceding and following each of the other symbols,
 (c) each of said symbols being defined by at least one of said patterns,
 (d) said patterns being characterized by alternate stripes of contrasting transmissivities with said stripes being of equal width with respect to each other and each of said patterns have its stripes disposed at a predetermined angle different from that of any other pattern,
 (e) a plurality of reference masks corresponding to the number of said patterns in spaced location with respect to said identification symbols,
 (f) each of said masks having a correspondingly disposed pattern defined by corresponding stripes of contrasting transmissivities and aligned with its associated pattern,
 (g) detector means cooperative with respective reference masks and said identification symbols and responsive to the relative movement of said identification symbols with respect to said reference masks for providing output signals representative of a function of the optical correlation therebetween,
 (h) signal processing channels responsive to respective detector means,
 (i) one of said signal processing channels being responsive to said intersymbol for providing an automatic gain control signal representative of a function of the ambient light level and relative contrast of the stripe patterns of all of said symbols,
 (j) automatic gain control means in each of said channels responsive to said automatic gain control signal for compensating said detector output signals in accordance therewith for providing an automatic gain control compensated signal,
 (k) peak detector means responsive to said automatic gain control compensated signal for providing a peak signal representative of the largest of said automatic gain control compensated signals,
 (l) comparator means responsive to said automatic gain control compensated signal and said peak signal for providing a comparator output signal when said automatic gain control compensated signal exceeds a predetermined value with respect to said peak signal, and
 (m) signal utilization means responsive to said comparator output signal.

11. In a system of the character described in claim 10 in which said detector means has a decreasing gain versus frequency characteristic and further including detector frequency gain compensating means responsive to said detector output signals and having a rising gain versus frequency characteristic that compensates for the decreasing frequency responsive characteristic of said detector means for providing a frequency compensated signal that remains constant in spite of variations in the relative speed of said identification symbols with respect to said reference masks.

12. In a system of the character described in claim 10 in which each of said symbols is defined by a predetermined number of said patterns and further including parity check means responsive to said predetermined number of patterns for indicating parity has not been met when other than said predetermined number of patterns is measured with respect to each of said symbols.

13. In a system of the character described in claim 10 further including,
 (a) means responsive to a first code symbol for providing a forward readout command signal when said first code symbol is scanned first, and
 (b) means responsive to a second code symbol for providing a backward readout command signal when said second code symbol is scanned first.

14. An optical correlation identification system for use with teletype code comprising,
 (a) a predetermined plurality of patterns for defining a substantially larger plurality of identification symbols representing letters, numerals, characters and code devices, a combination of which define identification indicia, said code devices including a letter symbol, a figure symbol and an intersymbol,
 (b) said identification indicia usually consisting of a group of letters and a group of numerals with said group of letters preceded and followed by said letter symbol and said group of numerals preceded and followed by said figure symbol with said intersymbol preceding and following each of the other symbols,
 (c) each of said symbols being defined by at least one of said patterns,
 (d) the first five patterns being arranged to correspond to channels one to five respectively of the teletype code,
 (e) the sixth pattern being disposed at a predetermined angle representing a parity angle,
 (f) the seventh pattern being disposed at a predetermined angle representing an intersymbol angle,
 (g) a plurality of reference masks corresponding to the number of said patterns in spaced location with respect to said identification symbols.
 (h) each of said masks having a correspondingly disposed pattern defined by corresponding stripes of contrasting transmissivities and aligned with its associated pattern, and
 (i) detector means cooperative with respective reference masks and said identification symbols and responsive to the relative movement of said identification symbols with respect to said reference masks for providing output signals representative of a function of the optical correlation therebetween.

15. In a system of the character described in claim 14 further including,
 (a) signal processing channels responsive to respective detector means,
 (b) one of said signal processing channels being responsive to said intersymbol for providing an automatic gain control signal representative of a function of the ambient light level and relative contract of the stripe patterns of all of said symbols, (c) automatic gain control means in each of said channels responsive to said automatic gain control signal for compensating said detector output signals in accordance therewith for providing an automatic gain control compensated signal, (d) peak detector means responsive to said automatic gain control compensated signal for providing a peak signal representative of the largest of said automatic gain control compensated signals, (e) comparator means responsive to said automatic gain control compensated signal and said peak signal for providing a comparator output signal when said automatic gain control compensated signal exceeds a predetermined value with respect to said peak signal, and (f) signal utilization means responsive to said comparator output signal.

16. In an optical correlation identification system of the character described in claim 14 in which said detector means has a decreasing gain versus frequency characteristic and further including detector frequency gain compensating means responsive to said detector output signals and having a rising gain versus frequency characteristic that compensates for the decreasing frequency responsive characteristic of said detector means for providing a frequency compensated signal that remains constant in spite of variations in the relative speed of said identification symbols with respect to said reference masks.

17. In a system of the character described in claim 14 in which each of said symbols is defined by a predetermined number of said patterns and further including parity check means responsive to said predetermined number of patterns for indicating parity has not been met when other than said predetermined number of patterns is measured with respect to each of said symbols.

18. In a system of the character described in claim 14 in which said identification indicia usually consists of a group of letters preceding a group of numerals and further including, (a) means responsive to said letter symbol for providing a forward readout command signal when said letter symbol is scanned first, and (b) means responsive to said figure symbol for providing a backward readout command signal when said figure symbol is scanned first.

References Cited

UNITED STATES PATENTS

| 3,106,706 | 10/1963 | Kolanowski et al. | 340—146.3 |
| 3,167,744 | 1/1965 | Rabinow | 340—146.3 |
| 3,267,259 | 8/1966 | Bailey et al. | 340—146.3 |

FOREIGN PATENTS

| 1,319,644 | 1/1963 | France. |

MAYNARD R. WILBUR, *Primary Examiner.*

R. F. GNUSE, *Assistant Examiner.*

U.S. Cl. X.R.

340—146.3, 149; 246—2